United States Patent
Peter

[11] Patent Number: 5,951,395
[45] Date of Patent: Sep. 14, 1999

[54] COMBINE GRAIN LOSS RECEPTACLE

[75] Inventor: Jeffrey Peter, Hicksville, Ohio

[73] Assignee: Farmer Fabrications, Inc., Hicksville, Ohio

[21] Appl. No.: 08/912,386

[22] Filed: Aug. 18, 1997

Related U.S. Application Data

[63] Continuation-in-part of application No. 08/696,365, Aug. 13, 1996, abandoned.

[51] Int. Cl.[6] .................................................. A01F 12/00
[52] U.S. Cl. ........................... 460/119; 460/4; 460/149
[58] Field of Search ......................... 460/119, 1, 4, 460/5, 149, 150, 903

[56] References Cited

U.S. PATENT DOCUMENTS

| | | | |
|---|---|---|---|
| 3,556,108 | 1/1971 | Knapp et al. | 130/27 |
| 3,593,720 | 7/1971 | Botterill | 130/27 W |
| 4,178,944 | 12/1979 | Hanaway | 130/27 R |
| 4,393,704 | 7/1983 | Bartko | 460/5 |
| 4,441,511 | 4/1984 | Schroeder | 130/27 Z |
| 4,441,512 | 4/1984 | Busboom | 130/27 Z |
| 4,467,818 | 8/1984 | Donaldson | 130/27 T |
| 4,490,964 | 1/1985 | Eldredge | 460/5 |
| 5,498,206 | 3/1996 | Underwood | 460/14 |
| 5,499,948 | 3/1996 | Underwood | 460/119 |
| 5,509,854 | 4/1996 | Underwood | 460/13 |

*Primary Examiner*—Terry Lee Melius
*Attorney, Agent, or Firm*—Baker & Daniels

[57] ABSTRACT

The present invention relates to a combine grain receptacle which collects grain and chaff expelled from the combine to allow the operator to determine the amount of grain being expelled from the combine and therefore being wasted. A conventional combine or a rotor combine cuts the crop to be harvested and breaks the crop down into usable grain and unusable chaff. The grain receptacle is releasably attached to the underside of the combine and may be dropped directly upon the field being harvested when the operator so desires. Once the receptacle is released upon the field, the grain and chaff are collected thereon as the combine traverses the field, whereupon the operator will then stop the combine and inspect the receptacle. The receptacle allows the operator to quickly determine not only the amount of grain being expelled from the combine, but also to differentiate the grain expelled from the combine from the grain which was preexisting on the field and had been uncollected by the header of the combine in the first place. If the amount of grain in the receptacle is beyond an acceptable limit, the operator may then adjust the speed of the blower fan accordingly. Once the receptacle has been inspected, it can be reattached to the brackets provided on the combine for subsequent uses.

23 Claims, 5 Drawing Sheets

COMBINE GRAIN LOSS RECEPTACLE

This application is a Continuation-in-Part of application Ser. No. 08/696,365, now abandoned.

BACKGROUND OF THE INVENTION

1. Field of the Invention

The present invention generally relates to harvesting combines, and more particularly relates to harvesting combines having mechanisms for determining the amount of grain loss processed through the harvesting combine.

2. Description of the Related Art

A harvesting combine is a valuable agricultural tool which combines the functions of harvesting or gathering a crop with the function of separating the usable grain from the stalk in which the grain grows. The usable grain is collected and stored while the chaff, i.e., the stalk after the grain has been removed, is exhausted from the combine and thrown upon the field.

A typical combine includes a vehicle chassis with a pair of drive wheels driven by an engine, and a pair of steering wheels controlled by the operator. The operator is provided with an operator cabin. The front of the combine is provided with a header section, which is an elongate body disposed transverse to the longitudinal axis of the combine chassis and provided with a plurality of knives or shears which cut the grain stalks as the combine traverses a field to be harvested. The header is provided with an auger which draws the cut grain stalks into the header section and upward toward the body of the combine. A conveyor belt or similar conveying mechanism is then provided to transport the cut grain stalks from the auger of the header section to a thresher or threshing unit.

The threshing unit is often in the form of a rotating cylinder with a plurality of rasps or bars rotating within a barrel which thrash the cut stalks as it rotates. The usable grain is thereby removed from the grain stalks and is fed from the thresher unit to a mechanism for separating the usable grain from the chaff. The separating mechanism is often in the form of a vibrating sieve which has a plurality of apertures sized to allow the individual grain kernels to pass therethrough but which prevent passage of the chaff. The grain is thereby separated from the chaff and is conveyed to a storage bin or hopper also provided within the combine.

In order to remove the chaff from the top of the vibrating sieve, a blower fan is provided to direct a stream of air across the top of the vibrating sieve. The vibrating fan blows with enough force to carry the chaff off of the vibrating sieve and to an exhaust outlet at the back of the combine. The chaff is thereby removed from the combine and thrown onto the field being harvested.

With conventional combines, the blower fan blows an air stream across the sieve with a constant speed which is often sufficient to carry the usable grain along with the chaff out of the combine. This therefore results in grain loss and ultimately in lost profits. Combines are sometimes provided with adjustable speed blowers which allow the operator to increase or decrease the speed of the blower and thereby the force of the air stream across the sieve. For example, if the crop being harvested is particularly moisture-laden, then the crop will be relatively heavy and will require a stronger air stream to be removed from the sieve. However, in order to determine whether the blower fan is operating at a correct speed, the operator is forced to either place a container below the exhaust of the combine to gather the product being blown from the combine, or inspect the field directly behind the combine.

Both of these options have proven to be unacceptably inconvenient, expensive, or inaccurate. First, the act of collecting the product from the combine exhaust requires that a worker run along with the moving combine and place an object as well as the worker's body next to the moving combine. This is not only inconvenient and expensive in that it requires a worker in addition to the operator riding in the combine, but it has often proven to be a dangerous undertaking in that the worker running along with the combine is subject to being injured by the moving parts of the combine.

Second, the option of inspecting the field directly behind the moving combine has proven to be inaccurate. Since any combine will not gather 100 percent of the stalks and grain within a given field, a certain amount of grain will always be on the field directly behind the moving combine. Therefore, when the chaff and grain are exhausted from the moving combine, the grain thrown from the combine is mixed directly with the grain which was not gathered by the header in the first place. The operator or worker is therefore unable to differentiate between the grain being exhausted through the combine from that which was pre-existing on the ground.

The prior art has attempted to overcome these problems by providing combines with devices for monitoring the amount of grain loss processed through the combine. For example, one known system includes a combine grain loss monitor wherein the combine is provided with a primary separating sieve and a secondary separating sieve. As the grain is gathered through the header and processed through the thresher, the chaff and grain are separated through the primary sieve and the grain processed therethrough is collected for storage. The chaff and grain which are blown from the primary sieve are then conveyed to a secondary sieve rather than being exhausted from the combine. The secondary sieve again attempts to separate the usable grain from the unusable chaff with the unusable chaff being exhausted from the combine. The grain passing through the secondary sieve is then measured and a signal is fed to the operator's panel to indicate the amount of grain processed therethrough. If the amount of grain processed therethrough is beyond an acceptable limit, the operator can adjust the ground speed of the combine. However, such a device does not determine whether the speed of the sieve blower is set incorrectly, but rather only determines whether the ground speed of the combine is set incorrectly. Moreover, the addition of a secondary sieve and measuring device as well as the conveyance mechanism necessary for conveying the grain and chaff from the primary sieve to the secondary sieve adds considerable expense to the resulting combine.

SUMMARY OF THE INVENTION

The present invention solves the above-identified needs by providing an inexpensive and effective means for accurately measuring the amount of grain loss processed through a combine which allows a single operator to quickly and efficiently measure the amount of grain loss and set the speed of the sieve blower accordingly.

The present invention provides a grain receptacle releasably attached to the chassis of a combine which can be deployed upon the field being harvested when the operator wishes to monitor the amount of grain being exhausted from the combine. If the speed of the blower blowing across the vibrating sieve is set too high, a certain amount of grain may be carried along with the unusable chaff and be exhausted upon the field being harvested. This will result in lost grain and lost profits.

However, with the present invention, when the operator wishes to determine the amount of grain being exhausted from the combine, the operator deploys the grain receptacle onto the field and proceeds to traverse the field being harvested such that chaff and grain exhausted from the combine are collected in the grain receptacle. The operator then stops the combine and inspects the grain receptacle. By inspecting the grain receptacle, the operator can determine the amount of usable grain contained therein. If the grain receptacle contains usable grain beyond an acceptable limit, the operator can then adjust the sieve blower to a lower speed. Although the blower speed can be set at a certain speed for a given crop, the speed of the blower may need to be changed on a daily or hourly basis depending on the weather conditions of the given day as well as the crop being harvested.

By using a grain receptacle to collect the grain being harvested, the operator will be able to easily and quickly determine the grain processed through the combine from the grain on the harvested field which was never gathered by the header in the first place.

After the operator has inspected the grain receptacle and adjusted the speed of the blower accordingly, the grain receptacle can then be reattached to the releasable brackets attached to the combine chassis and normal harvesting operation of the combine can continue.

One advantage of the present invention is that it provides for an inexpensive means of monitoring and measuring the amount of grain loss processed through a given combine.

Another advantage of the present invention is that it provides a quick and reliable means for monitoring the correct speed for the sieve blower.

Another advantage of the present invention is that it allows a single operator to both operate the combine and measure the amount of grain loss to thereby reduce labor costs.

Yet another advantage of the present invention is that it provides for a means of monitoring grain loss which does not require the operator to come in close proximity to the moving parts of the combine and therefore decreases the risks compared to that disclosed in the prior art.

The present invention provides, in one form thereof, an improvement to a harvesting combine wherein the harvesting combine has a vehicle body, a pair of drive wheels, a header disposed transverse to the vehicle body for cutting the crop being harvested and drawing the crop into the combine, a thresher to remove grain from the stalks of the crop, at least one sieve for separating the grain from the chaff so that the grain can be stored, and a blower disposed proximate the sieve to remove the chaff from the sieve by blowing the chaff out of the combine. The improvement comprises a grain receptacle detachably coupled to the combine, space allowing for sliding the receptacle into a stowed position beneath the combine from the lateral side thereof, and a mechanism including at least one hinged bracket for detachably deploying the grain receptacle from the combine onto a field being harvested such that after deploying the grain receptacle, stalks and grain being blown from the combine may collect in the grain receptacle as the combine traverses the field. Grain being blown from the combine may collect in the receptacle to allow the operator to adjust the speed of the sieve blower depending on whether the amount of grain collected in the receptacle is within predetermined parameters.

The present invention provides, in another form thereof, a combine comprising a chassis, a header, a thresher, a sieve, a blower fan, and a grain receptacle. The chassis is provided with an operator cabin adapted to receive an operator of the combine. The header is attached to the front of the chassis and rides along the ground and cuts grain stalks from a field to be harvested. A thresher is disposed within the combine and receives the harvested grain stalks from the header. The thresher breaks the grain stalks down to remove the grain from the stalks. The sieve is disposed within the combine and receives the grain stalks from the thresher and has a vibrating apertured surface which allows substantially all the grain to fall therethrough for collection while the chaff remains on the vibrating sieve. The blower fan is disposed proximate the vibrating sieve and directs a stream of air across the sieve to carry the chaff away from the sieve and out of the combine. A grain receptacle is detachably coupled to the underside of the chassis, inserted from the lateral side of the combine into a space provided in a mechanism for deploying the grain receptacle by the operator directly onto the field being harvested.

The present invention, in yet another form thereof, provides a method for reducing the grain loss of a harvesting combine comprising the steps of inserting from the lateral side of the combine a grain receptacle into a structure comprising at least one hinged bracket and located beneath the combine, collecting the material blown from the combine, determining the amount of grain contained within the material blown from the combine, and adjusting the fan speed of the sieve blower if the amount of grain blown from the combine is beyond a predetermined limit. The collecting step is performed as the combine traverses the field being harvested and is done such that the material blown from the combine is separated from the material preexisting on the ground.

BRIEF DESCRIPTION OF THE DRAWINGS

The above mentioned and other features and advantages of this invention, and the manner of attaining them, will become more apparent and the invention will be better understood by reference to the following description of an embodiment of the invention taken in conjunction with the accompanying drawings wherein.

Figure 1:
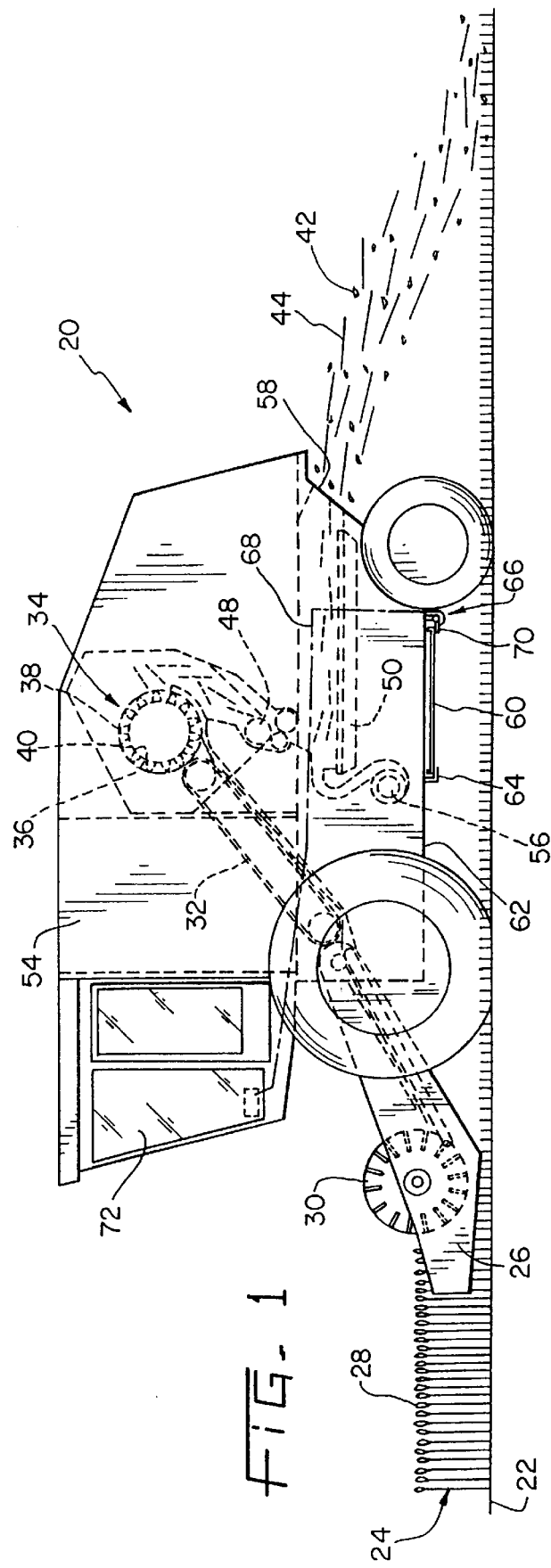
FIG. 1 is a left side view of one embodiment of the present invention with the grain receptacle attached thereto.

Corresponding reference characters indicate corresponding parts throughout the several views. Although the drawings represent one embodiment of the present invention, the drawings are not necessarily to scale and certain features may be exaggerated in order to better illustrate and explain the present invention. The exemplification set out herein illustrates one embodiment of the invention, and such exemplification is not to be construed as limiting the scope of the invention in any manner.

DETAILED DESCRIPTION OF THE INVENTION

The embodiment disclosed below is not intended to be exhaustive or limit the invention to the precise form disclosed in the following detailed description. Rather, the embodiment is chosen and described so that others skilled in the art may utilize its teachings.

Referring now to FIG. 1, combine 20 is shown in field 22 harvesting crop 24, with crop 24 being drawn into combine 20 through header 26. Alternatively, the present invention is also compatible with a rotor combine. As is conventional, header 26 includes a plurality of blades, knives, or other implements (not shown) which cut stalks 28. Header 26 includes auger 30 which draws cut stalks 28 into combine 20 as it rotates.

Conveyor 32 then carries the cut stalks from auger 30 to thresher 34. Thresher 34 is also conventional in that it includes rotating cylinder 36 having a plurality of rasps 38 radially disposed thereon and rotating within barrel 40. As stalks 28 are fed to thresher 34 by conveyor 32, the stalks are drawn into thresher 34 by rotating cylinder 36 and are compressed between rasps 38 and the inner circumference of barrel 40. This motion physically breaks down stalks 28 so as to remove usable grain kernels 42 from unusable chaff 44.

Grain 42 and chaff 44 is then fed from cylinder 36 to feeder rollers 48. Feeder rollers 48 provide a smooth and consistent stream of grain 42 and chaff 44 to sieve 50. Sieve 50 is a planar body with a plurality of apertures 52 sized to allow grain 42 to fall therethrough but to prevent chaff 44 from also passing therethrough. Sieve 50 vibrates to assist the separation of grain 42 from chaff 44. When grain 42 falls through sieve 50, it is conveyed to hopper section 54 for storage.

Blower fan 56 is provided adjacent sieve 50 to direct a stream of air across the top surface of sieve 50 to carry chaff 44 out of combine 20 through exhaust outlet 58. Blower fan 56 is a variable speed fan which allows the operator to set the speed of the fan depending on various parameters such as the moisture content of crop 24, as well as the individual type of crop 24 being harvested. If crop 24 is particularly wet or heavy, the speed of fan 56 will have to be increased to generate a strong enough air stream to carry resulting chaff 44 off sieve 50.

Figure 4A:
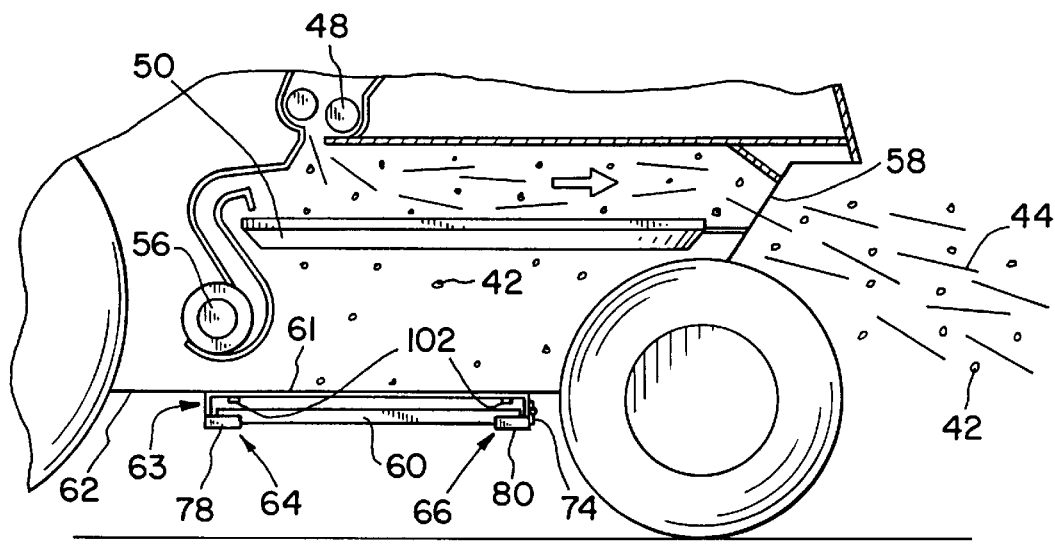
FIG. 4A is a fragmentary, partial sectional left side view of the sieve, blower fan, grain receptacle and rear portion of the combine chassis of a second embodiment of the present invention.

Grain receptacle 60, through housing 61, is releasably attached to the underside of combine chassis 62. In the exemplary embodiments, as best seen in FIGS. 1 and 4C, grain receptacle 60 is a planar sheet with raised edges to thereby define a parallelepiped with an open top. However, pans having other shapes as well as receptacles other than pans can be used as grain receptacle 60. In the exemplary embodiments, grain receptacle 60 has a height of approximately 1½ inches and is manufactured from aluminum although other durable materials are suitable, such as plastic, stainless steel, tin, and the like.

Grain receptacle 60 has a width with a predetermined correspondence to the width of sieve 50. For example, grain receptacle 60 may have a width substantially equal to the width of sieve 50 to thereby capture grain and chaff blown from across the entire width of sieve 50. Alternatively, grain receptacle 60 may have a width which captures only a portion of grain and chaff blown from the sieve. Regardless of the width of receptacle 60, because receptacle 60 has a predetermined correspondence to the width of the sieve 50, the operator will know the correspondence will be able to calculate by methods known in the art the actual grain loss of the combine based on the predetermined receptacle-to-sieve width correspondence.

As seen in FIG. 4C, grain receptacle housing 61 comprises upper portion 76 and substantially L-shaped fixed bracket 64, which may be attached to upper portion 76 or integral thereto. Housing 61 further comprises substantially L-shaped hinged bracket 66 hingedly attached to upper portion 76 and having swinging leg 70 which extends substantially horizontally in a forward direction when receptacle 60 is stowed beneath combine 20 and housing 61 is closed. Hinge 74 attaches bracket 66 to upper portion 76. In the exemplary embodiments, the lowermost surfaces of the horizontally extending legs of brackets 64, 66 lie approximately 3 inches below the lowermost surface of housing upper portion 76. Housing 61 may be attached to the underside of chassis 62 by any secure, conventional method. For example, housing 61 may be attached to chassis 62 by means of bolts 102 (FIG. 4A) extending through retaining apertures 104 in housing upper portion 76 (FIG. 4C) and threaded into receiving bolt holes (not shown) in chassis 62. Alternatively, fixed bracket 64 and hinge 74 may be adapted to directly attach to chassis 62, or upper portion 76 be comprised of two individual sections, each respectively attached to brackets 64 and 66.

To ensure secure stowage of receptacle 60, fixed bracket 64 and hinged bracket 66 may be provided with tabs 78, 80 (FIG. 4A) which are integrally formed into the ends of brackets 64, 66 and which extend vertically from the lower, horizontally-extended surfaces thereof. In the exemplary embodiments, where receptacle has a height of approximately 1½ inches and housing 61 has a height of approximately 3 inches, tabs 78, 80 extend upwards from the lowermost horizontal surfaces of brackets 64, 66 a distance of approximately 1 inch. With housing 61 in its closed position, i.e., where hinged bracket leg 70 assumes a horizontal orientation, receptacle 60 may be easily inserted therein from the lateral side of combine 20 by sliding receptacle 60 in the direction of arrow 71 into housing 61 between the uppermost surfaces of tabs 78, 80 and the lower surface of housing upper portion 76, as shown in FIG. 4C. Once receptacle 60 has been fully inserted into housing 61, receptacle 60 will drop to rest on the horizontally extending legs of L-shaped brackets 64 and 66 and be prevented from sliding out of housing 61 by abuttingly engaging tabs 78, 80.

In the exemplary embodiments, where receptacle 60 is approximately 1½ inches high, housing 61 has a height of approximately 3 inches and tabs 78, 80 extend upwardly from the lowermost surfaces of brackets 64, 66 approximately 1 inch, approximately ½ inch of clearance is provided between the height of receptacle 60 and the vertical distance between the uppermost tab surfaces and the lower surface of housing upper portion 76 and between the horizontally extending legs of brackets 64, 66 and lower surface of housing upper portion 76, allowing easy insertion of receptacle 60 into closed housing 61, as shown in FIG. 4C. In this manner receptacle 60 may be easily inserted into closed housing 61 through space 63 on the lateral side of combine 20, rather than from underneath same, providing the advantages of easy insertion without the operator having to crawl beneath the combine. Once receptacle 60 is fully inserted through space 63 of housing 61 and seated between tabs 78, 80, the open distance above the lateral edges of receptacle 60 is only about 1½ inches, which effectively prevents debris from outside combine 20 from entering the stowed receptacle. The above cited dimensions relating to receptacle 60, housing 61 and its tabs 78, 80 are illustrative of but one embodiment of the present invention. Other embodiments having dimensions differing from those described above and which also provide easy insertion of receptacle 60 into closed housing 61 and prevent debris from outside combine 20 from entering stowed receptacle 60 are within the scope of this invention.

Figure 2:
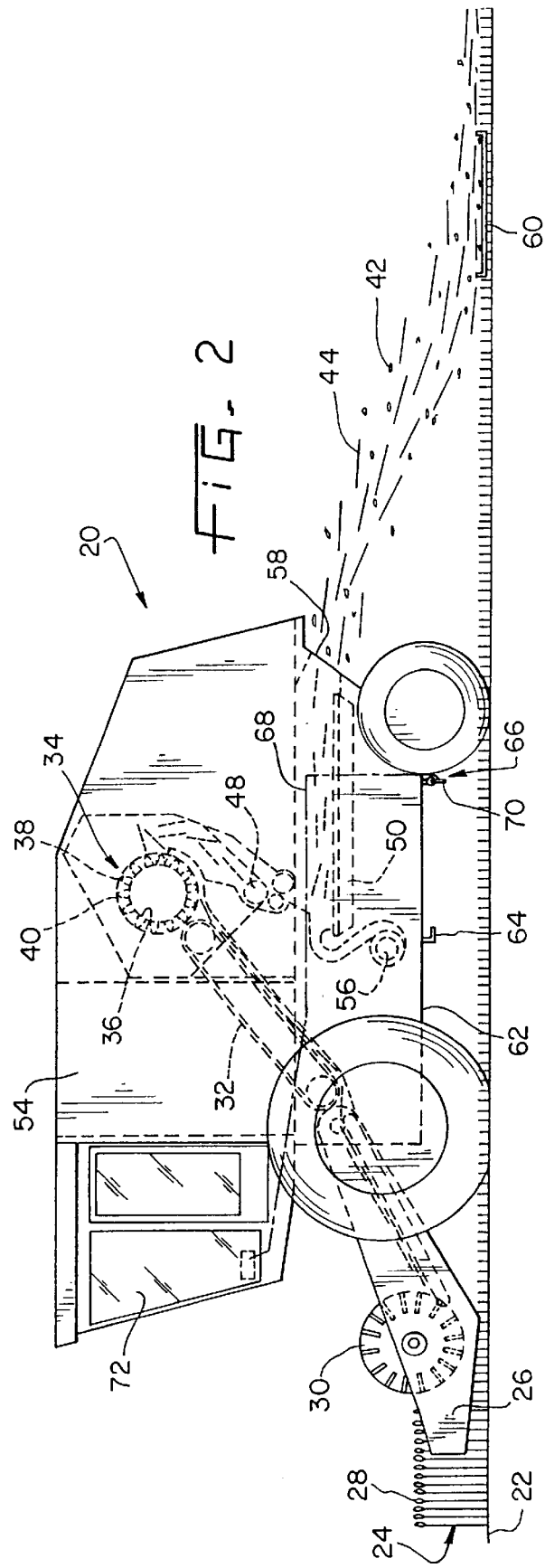
FIG. 2 is a left side view of the embodiment of FIG. 1 with the grain receptacle released upon the field being harvested.
Figure 3:
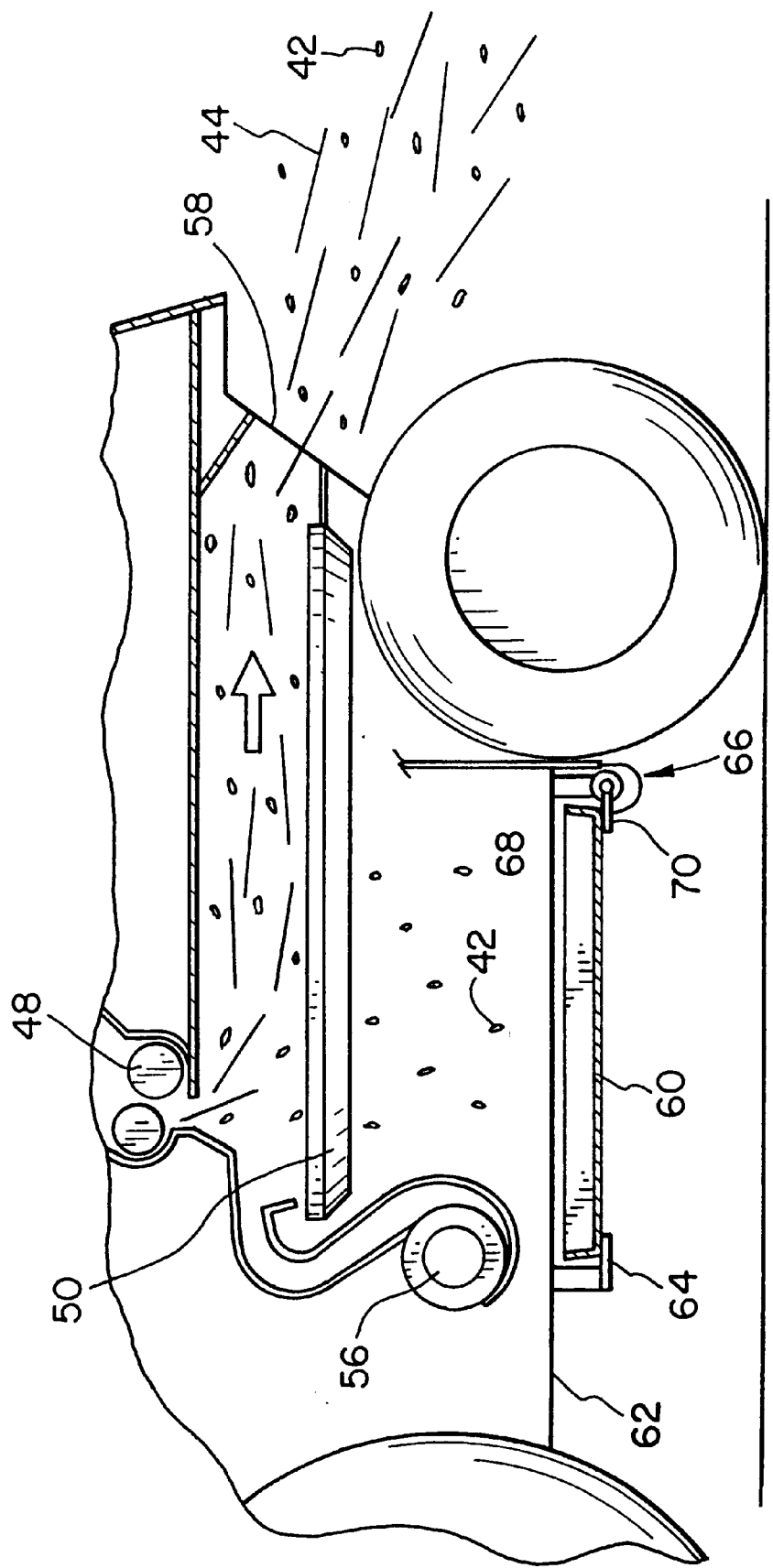
FIG. 3 is a fragmentary, partial sectional left side view of the sieve, blower fan, grain receptacle and rear portion of the combine chassis of the embodiment of FIG. 1.

In the embodiments shown in FIGS. 1—3, release cable 68 is attached to swingable arm 70 of hinged bracket 66. Therefore, when the operator wishes to deploy grain receptacle 60, release cable 68 is pulled directly or via a mechanism such as an air cylinder or a solenoid by the operator to retract swingable leg 70 to thereby release and allow grain receptacle 60 to fall onto field 22. In the exemplary embodiment, the actuation mechanism for release cable 68 is provided within operator cabin 72 to allow the operator situated therein to release receptacle 60 as combine 20 traverses field 22.

Figure 4B:
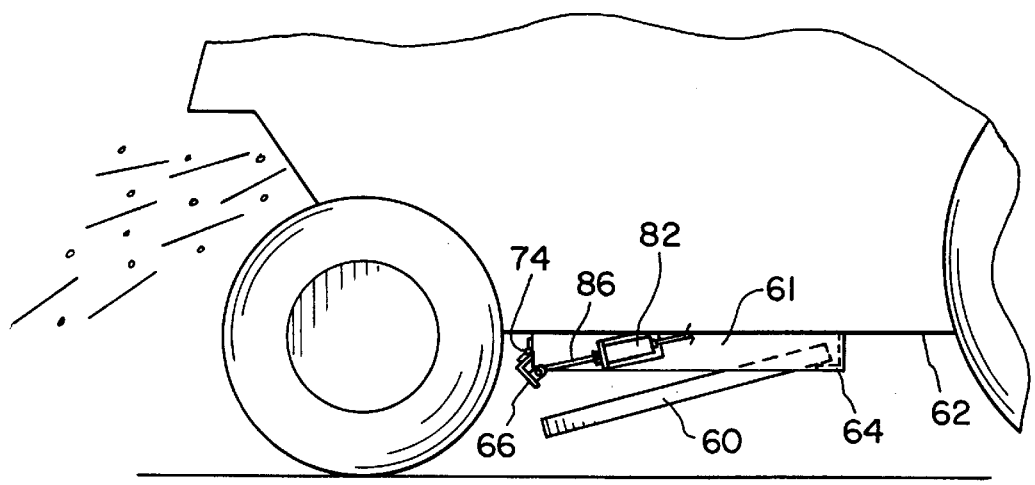
FIG. 4B is a fragmentary sectional right side view of the combine chassis of the embodiment of FIG. 4A.
Figure 4C:
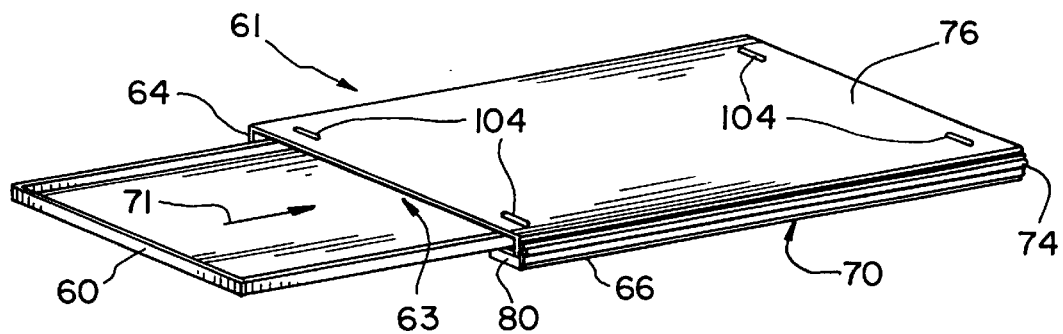
FIG. 4C is a perspective view of the receptacle of the present invention and its receiving housing, showing the receptacle being inserted into the side of the housing.
Figure 5A:
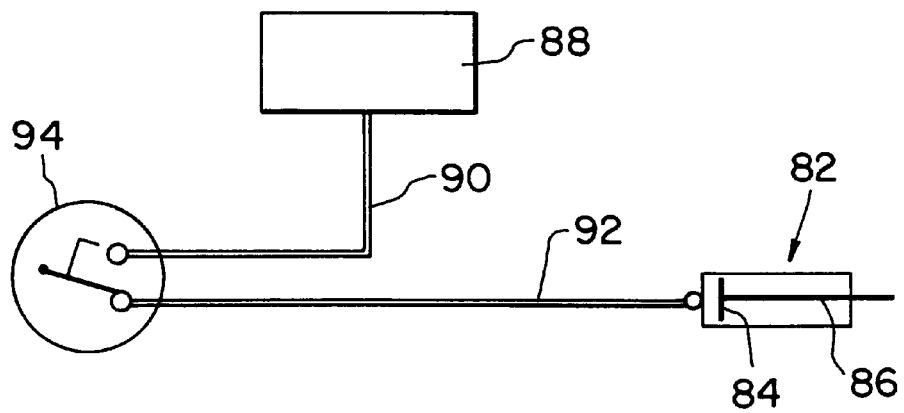
FIG. 5A is a schematic of a pneumatic circuit used for actuating the release mechanism of the present invention, used in the embodiments of FIGS. 4A and 4B.
Figure 5B:
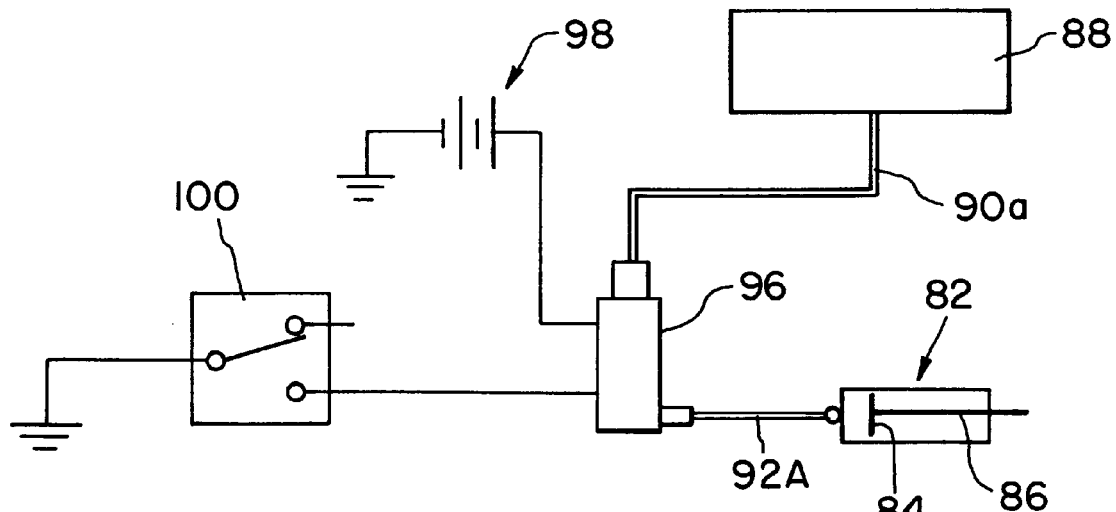
FIG. 5B is a schematic of an electropneumatic circuit used for actuating the release mechanism of the present invention, used in a third embodiment thereof.

In an alternative embodiment of the present invention, shown in FIG. 4B, pneumatic cylinder 82 may be mounted on the underside of chassis 62, the extending rod 86 of the cylinder connected to hinged bracket 66 for actuating swinging leg 70 thereof for releasing receptacle 60 from housing 61. Cylinder 82 may be actuated by the pneumatic circuit schematically shown in FIG. 5A. In this embodiment, a source of relatively high pressure air 88, which may be an air compressor or an air storage tank is connected via line 90 to a pneumatic switch 94 of known design, which is located in cabin 72. Actuation of switch 94 fluidly connects line 90 and line 92, which is connected to cylinder 82. As high pressure air enters cylinder 82, piston 84 forces rod 86 to be extended, swinging leg 70, causing receptacle to drop from housing 61 onto field 22. Similarly, a circuit employing electropneumatic valve 96, electrical source 98, which may be a battery or generator, and electric switch 100 may be employed. Here, as valve 96 is electrically opened via switch 100, high pressure air in supply 88 flows through lines 90a, 92a to cylinder 82, which resultantly causes receptacle to be dropped from housing 61 onto field 22 in the manner described above. Although other deployment mechanisms may be used, those described herein are believed to mitigate the risk of creating a spark in the vicinity of the newly shorn crop stalks and chaff, which may be flammable.

In an alternative embodiment not illustrated, receptacle 60 may be retained on the underside of chassis 62 by two hinged brackets, rather than by one hinged bracket and one fixed bracket. This embodiment can be readily visualized as comprising actuation means for each hinged bracket as described above for the single hinged bracket. In this embodiment, receptacle 60 would tend to drop straight down rather than having the end of receptacle 60 supported by swinging leg 70 first fall to the ground, followed by the opposite end thereof which had been supported by fixed bracket 64.

In operation, combine 20 is used to harvest crop 24 within field 22. Header 26 proceeds in front of combine 20 and cuts grain stalks 28, and auger 30 rotates to draw stalks 28 into combine 20. Stalks 28 are conveyed to thresher 34 via conveyor belt 32. Stalks 28 are broken down within thresher 34 by cylinder 36 rotating within barrel 40. Specifically, rasps 38 rotate within cylinder 36 and provide a small clearance between rasps 38 and the inner circumference of barrel 40 such that grain stalks 28 are physically broken down to release grain 42 from stalks 28. The separated grain 42 and chaff 44 are then communicated to vibrating sieve 50 wherein grain 42 falls through apertures 52 provided within sieve 50 and is then conveyed to hopper 54 for storage while chaff 44 remains on the top surface of sieve 50. A stream of air is generated by blower fan 56 which carries chaff 44 off of sieve 50 and out of combine 20 through exhaust outlet 58. If the speed of blower fan 56 is set too high, usable grain 42 can be carried along with chaff 44 and expelled through outlet 58. This will result in lost grain as well as lost profit.

In order for the operator to monitor such grain loss, grain receptacle 60 is provided. When the operator wishes to monitor the grain loss of combine 20, grain receptacle 60 can be deployed upon field 22 to allow the grain and chaff being exhausted through outlet 58 to collect thereon. The operator can then stop combine 20 and inspect the grain and chaff collected on receptacle 60 to determine if an unacceptably high amount of grain 42 is being exhausted from combine 20. If the amount of grain is beyond an acceptable limit, the operator can then adjust the speed of blower fan 56 accordingly. For example, if there are five grain kernels in grain receptacle 60, this would theoretically represent a loss of half a bushel of grain per acre harvested. This would indicate the blower speed should be lowered.

In order to deploy receptacle 60 upon field 22, the operator activates release cable 68 which pulls swingable arm 70 of hinged bracket 66 to release and allow grain receptacle 60 to fall downward due to gravity. When the operator is done inspecting grain receptacle 60, receptacle 60 can be reattached to fixed bracket 64 and hinged bracket 66.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains, and which fall within the limits of the appended claims.

What is claimed is:

1. In a harvesting combine having a vehicle body, a pair of drive wheels, a header disposed transverse to the vehicle body for cutting a crop being harvested and drawing the crop into the combine, a thresher to remove grain from the stalks of the crop, at least one sieve for separating the grain from the stalks so that the grain can be collected and stored, a blower disposed proximate the sieve to remove the stalks from the sieve by blowing the stalks out of the combine, the improvement comprising:

a grain receptacle coupled to the combine; and means for detachably deploying said grain receptacle from the combine onto a field being harvested when in an open deploying position such that after deploying said grain receptacle, stalks and grain being blown from the combine may collect in said grain receptacle as the combine traverses the field, said means for detachably deploying said grain receptacle including at least one hinged bracket, said means for detachably deploying said grain receptacle defining a space allowing for sliding said receptacle into a stowed position beneath the combine from the lateral side of the combine, with said means for detachable deploying said grain receptacle in a closed, non-deploying position, said hinged bracket adapted to open to an open, deployed position and thereby drop said grain receptacle directly onto the field.

2. The harvesting combine of claim 1, wherein said space provides clearance for the height of said receptacle for manual insertion of said receptacle into said means for detachably deploying said receptacle, whereby said grain receptacle may be easily slid into a stowed position.

3. The harvesting combine of claim 2, wherein said clearance ranges from about ⅛ inch to about 1 inch.

4. The harvesting combine of claim 1, wherein said means for deploying further includes a release cable operably connected to said hinged bracket.

5. The harvesting combine of claim 1, wherein said means for deploying further includes a pneumatic cylinder operably connected to said hinged bracket.

6. The harvesting combine of claim 1, wherein said grain receptacle has a width with a predetermined correspondence to the width of the combine sieve, an operator thereby being able to accurately calculate the combine grain loss based on the actual grain collected and the predetermined correspondence.

7. The combine of claim 1, wherein said grain receptacle includes a planar sheet with raised edges.

8. The combine of claim 1, wherein said receptacle is manufactured from stainless steel.

9. The combine of claim 1, wherein said receptacle is manufactured from plastic.

10. A combine, comprising:
    a chassis, said chassis provided with an operator cabin, said operator cabin adapted to receive an operator of said combine;
    a header attached to the front of said chassis, said header riding along the ground and cutting grain stalks from a field to be harvested;
    a thresher disposed within said combine and receiving the grain stalks from said header, said thresher breaking the grain stalks down to remove grain from the stalks;
    a sieve disposed within said combine and receiving the grain and stalks from said thresher, said sieve having a vibrating, apertured surface, substantially all the grain falling through said apertured surface and being collected, the stalks remaining on said vibrating sieve;
    a blower fan disposed proximate said vibrating sieve, said fan directing a stream of air across said sieve to carry the stalks away from said sieve and out of said combine;
    a grain receptacle detachably coupled to said chassis; and
    means for deploying said grain receptacle onto the field being harvested when in an open, deploying position, said means defining a space allowing for sliding said receptacle into a stowed position beneath the combine from the lateral side of the combine in a closed, non-deploying position of said means.

11. The combine of claim 10, wherein said space provides clearance for the height of said receptacle for manual insertion of said receptacle into said means for detachably deploying said receptacle, whereby said grain receptacle may be easily slid into a stowed position.

12. The combine of claim 11, wherein said clearance ranges from about ⅛ inch to about 1 inch.

13. The combine of claim 10, wherein said means for dropping includes at least one hinged bracket, said hinged bracket adapted to open to thereby release said grain receptacle directly onto the field.

14. The combine of claim 13 wherein said means for dropping further includes a release cable operably connected to said hinged bracket.

15. The combine of claim 13, wherein said means for dropping further includes a pneumatic cylinder operably connected to said hinged bracket.

16. The combine of claim 10, wherein said grain receptacle has a width with a predetermined correspondence to the width of said combine sieve, an operator thereby being able to accurately calculate the combine grain loss based on the actual grain collected and the predetermined correspondence.

17. The combine of claim 10, wherein said grain receptacle includes a planar sheet with raised edges.

18. The combine of claim 10, wherein said grain receptacle is manufactured from aluminum.

19. A method of reducing the grain loss of a harvesting combine having a grain delivery device, comprising the steps of:
    inserting from the lateral side of the combine a grain receptacle into a structure comprising at least one hinged bracket and located beneath the combine with the hinged bracket being in a closed position for stowing the grain receptacle,
    deploying the grain receptacle from the combine directly onto the ground during operation of the combine;
    collecting the material blown from the combine as the combine traverses the field being harvested such that said material is separated from the material pre-existing on the ground;
    determining the amount of grain contained within the material blown from the combine; and
    adjusting grain delivery device of the combine if the amount of grain blown from the combine is beyond a predetermined limit.

20. The method of claim 19, wherein said grain receptacle includes a planar sheet with raised edges.

21. The method of claim 20, wherein said grain receptacle has a width with a predetermined correspondence to the width of said combine.

22. The method of claim 19, wherein said determining step is performed by the operator inspecting the material blown from the combine and comparing the amount of grain contained therein to a predetermined level.

23. The method of claim 19, wherein said adjusting step is achieved by adjusting the fan speed of the combine.

* * * * *

UNITED STATES PATENT AND TRADEMARK OFFICE
CERTIFICATE OF CORRECTION

PATENT NO : 5,951.395
DATED : September 14, 1999
INVENTOR(S) : Jeffrey Peter

It is certified that error appears in the above-identified patent and that said Letters Patent is hereby corrected as shown below:

Claim 1, Column 9, Line 1, change "detachable" to --detachably--

Claim 19, Column 10, Line 44, after "adjusting" insert --the--

Signed and Sealed this

Eleventh Day of April, 2000

Attest:

Q. TODD DICKINSON

Attesting Officer

Director of Patents and Trademarks